(12) United States Patent
Mackelprang et al.

(10) Patent No.: US 8,195,321 B2
(45) Date of Patent: Jun. 5, 2012

(54) ITEM WORKFLOW TRACKING IN AN AUTOMATED PRODUCTION ENVIRONMENT

(75) Inventors: Mark G. Mackelprang, Cary, NC (US); Michael J. Maselli, Cary, NC (US); Robert Richards, Ontario (CA); Victor Tolomei, Raleigh, NC (US); Norbert Ruf, Oberottmarshausen (DE); Wolfgang Meinelt, Augsburg (DE)

(73) Assignee: Bell and Howell, LLC, Durham, NC (US)

( * ) Notice: Subject to any disclaimer, the term of this patent is extended or adjusted under 35 U.S.C. 154(b) by 299 days.

(21) Appl. No.: 12/572,764

(22) Filed: Oct. 2, 2009

(65) Prior Publication Data

US 2010/0106282 A1    Apr. 29, 2010

Related U.S. Application Data

(60) Provisional application No. 61/108,235, filed on Oct. 24, 2008.

(51) Int. Cl.
*G06F 19/00* (2011.01)
(52) U.S. Cl. .......................................... 700/100; 709/203
(58) Field of Classification Search .......... 700/100–102, 700/228; 707/2, 101; 709/101, 203
See application file for complete search history.

(56) References Cited

U.S. PATENT DOCUMENTS

| | | | |
|---|---|---|---|
| 6,370,521 B1 | 4/2002 | Pigos, Jr. et al. | |
| 6,467,687 B1 | 10/2002 | Hill et al. | |
| 6,901,412 B2 * | 5/2005 | Pigos et al. ........................... | 1/1 |
| 7,373,330 B1 * | 5/2008 | Klebe .............................. | 705/51 |
| 2002/0133472 A1* | 9/2002 | Stepno ........................... | 705/407 |
| 2004/0230543 A1 | 11/2004 | Baker et al. | |
| 2004/0252319 A1 | 12/2004 | Gorp et al. | |
| 2006/0139678 A1* | 6/2006 | Klopsch et al. .............. | 358/1.13 |

FOREIGN PATENT DOCUMENTS

EP     1 845 675 A    10/2007

OTHER PUBLICATIONS

European Search Report issued in European Patent Application No. EP 09 01 3365.3 dated Dec. 15, 2009.

* cited by examiner

*Primary Examiner* — Kidest Bahta
(74) *Attorney, Agent, or Firm* — McDermott Will & Emery LLP

(57) ABSTRACT

The progressive tracking of items in relation to other items as they are processed and transformed through a sequence of processes executed in a workflow procedure intended to produce a finished hard copy document product for transport to a destination location, as a result of a production run, enables permission based control of one or more processing steps during the production run and/or effective scheduling of any re-do operations that may be desired upon detection of any discrepancies in the item processing operations.

24 Claims, 4 Drawing Sheets

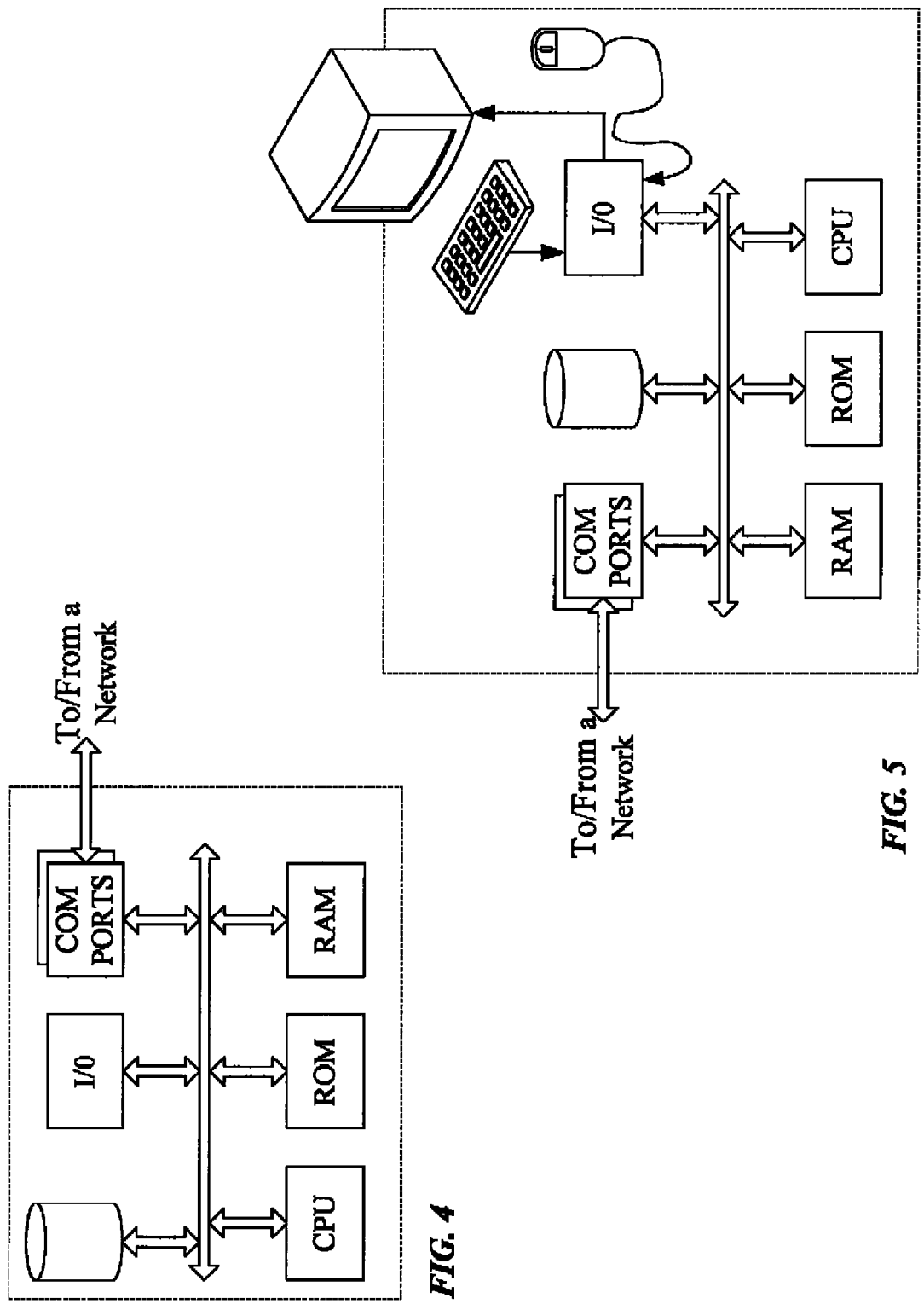

ITEM WORKFLOW TRACKING IN AN AUTOMATED PRODUCTION ENVIRONMENT

RELATED APPLICATIONS

This application claims the benefit of U.S. Provisional Application No. 61/108,235 Filed Oct. 24, 2008 entitled "Item Workflow Tracking in an Automated Production Environment," the disclosure of which also is entirely incorporated herein by reference.

TECHNICAL FIELD

The various methods, apparatuses and program products discussed herein enable progressive tracking of items in relation to other items as they are transformed into finished articles to produce a desired production outcome. Specific examples discussed herein relate to a document or package processing environment for producing mail articles for physical mail delivery.

BACKGROUND

Document processing facilities are a vital part of any major enterprise for ensuring effective mail based communication between the enterprise and its external and internal constituencies. Typically, document processing facilities employ a multitude of operational processes, people and/or machine resources and systems for processing the often massive quantities of letters, packages, envelopes, coupon booklets, brochures, post cards, and other items of mail intended for external distribution via a mail distribution network (e.g., the United States Postal Service (USPS)) or internal distribution within the enterprise. The types of processes performed respective to a mail article will vary depending on the mail article type, the function of the mail article and the capabilities and requirements of the machine resource or system engaged in that article's processing.

Types of machine resources found within a typical document processing facility may vary from one facility to the next, but may generally include sorters for sorting mail articles according to a sort scheme into one or more mail bins, inserters for manufacturing mail articles and preparing them for distribution, cutters, printers and folders for generating, assembling, arranging and organizing mail articles, mail bins for accumulating the multitude of mail articles processed in preparation for distribution, postage meters for applying postage to mail articles according to their particular weight class/mail category, etc. In addition, a multitude of computing resources may be interconnected with the various machines within the facility to ensure proper operation and connectivity of the devices (e.g., connectivity to an application server capable of executing software associated with the device) as well as to track articles during processing. Furthermore, each of these devices or computing resources may be supported and/or used by one or more device operators/users who execute tasks in connection with one or more customers, projects or procedures. Suffice to say, a plurality of machine resources, people, and processes must be effectively coordinated to ensure optimal operation of the document processing environment in the production of mail articles.

A key requirement to ensure such coordination within a production environment is through effective workflow management. Workflow management generally entails the strategic coordination, engagement and monitoring of one or more machine resources and one or more processes for the fulfillment of a particular job. In the case of a document processing environment, an exemplary job may be the production of a plurality of mail articles from various types of items—envelopes, various inserts, customized documents—intended for distribution in the mail articles to various mail recipients. Production of a mail article may involve differing machine resources and processes as performed by an inserter system to render the finished mail article including but not limited to: printing of data onto the envelope or inserts, lamination or embossing of data onto the envelope or inserts, application of glue at target locations of the envelope or insert, cutting or folding of inserts, assembling of inserts relative to a specific mail recipient, insertion of inserts, sealing of envelopes.

In such a production environment, where multiple individual items combine to formulate a distinct mail article, it would be beneficial to track and account for each item as it morphs into the intended final product (mail article) during the production process. It would also be desirable to use the item tracking/accounting information to provide more detail regarding the workflow process as it pertains to each item involved to ensure workflow integrity. Hence a need exists for technology to provide progressive tracking of items in relation to an automated workflow producing finished articles, for example, for tracking of individual items intended for mailing through the workflow production of finished mail articles.

SUMMARY

The teachings herein address the above discussed need for improved tracking of items used in an automated production environment, by progressively tracking items in relation to an automated workflow producing finished articles that incorporate the tracked items.

A number of disclosed methods progressively track and control the processing of individual physical items required to produce a finished hard copy document product for transport to a destination location, as a result of a production run, through a sequence of processes executed in a workflow procedure intended to produce the finished product. Such a method might involve initializing a workflow template. The template identifies each of the individual items and one or more machine resources needed for the production of the finished product. The template also identifies the processes to be executed by the machine resources to transform individual items from one state to another, in an order of a sequence of the processes defined in accord with a workflow procedure, and relationships between individual items. The method may also entail starting the production run, to produce the finished product, in accordance with the workflow procedure. During the production run, identifications are recorded as each respective process is executed in the workflow procedure, upon completion of item transformation by the respective process. The recorded identifications include an identification value assigned to at least one of the individual items upon which the respective process has been executed, and an identification value assigned to a machine resource which executed the respective process on the item(s).

A first example of such a method involves a permission based control of at least one respective process. In that example, before the respective process is executed in the workflow procedure, the method involves analyzing the recorded data for one or more of the items to be processed by that process. Then, execution of the one respective process is permitted only upon determining that each of one or more of items to be processed by that particular process has been transformed through all of the processes preceding the one respective process and in the order for the preceding processes as specified by the defined sequence.

Another example of such a method might lead to a re-do operation, with respect to one or more of the items. In that example, before at least one respective process is executed in the workflow procedure, recorded data for one or more of the items to be processed by that process is analyzed, and a discrepancy may be detected with respect to the processing of one or more of the physical items required to produce the finished hard copy document product. In such a case, the method further involves scheduling a re-do of an item subject to the discrepancy, at a specified process of the workflow procedure and executing the re-do of the subject item in accordance with the schedule. One or more of the processes of the workflow procedure may then be executed, to produce the finished product, using the re-do of the subject item.

Other concepts relate to document production systems for implementing one or more of the disclosed methodologies. An exemplary system might include one or more machine resources needed for the production of a finished hard copy document product for transport to a destination location from individual physical items, by executing a number of processes. Each process transforms one or more of the individual items from one state to another. The system also includes a computer coupled for communication with the one or more machine resources, for progressively tracking and controlling processing of individual physical items through the execution of the transformations by the resource processes. The computer is programmed to perform functions generally similar to the steps of one or more of the methods discussed herein.

Other concepts relate to unique software for implementing the item tracking and process control techniques. A software product or "program article of manufacture," in accord with this concept, includes at least one machine-readable storage medium and information carried by the medium. The information carried by the medium may be executable program code, one or more databases and/or information regarding tracking of items used in an automated production environment, by progressively tracking items in relation to an automated workflow producing finished articles the incorporate the tracked items.

The disclosure also covers a method for processing the individual physical items to produce the finished hard copy document product, which involves processing one or more items by one or more machine resources through a workflow procedure designated in accordance with a workflow procedural template. Each of the respective one or more items and one or more resources has an assigned unique identification value. This exemplary method also entails obtaining the identification value of one or more items as processed by each of the one or more machine resources, and sending the identification values to a control processor, both for the item or items processed and for the one or more machine resources upon which the item(s) were processed. The control processor may detect a discrepancy in processing in accordance with the workflow template, at a point in the designated workflow procedure. This methodology broadly encompasses two alternative possible treatments that may be provided in response to the discrepancy, based at least in part on the recorded identification value of at least one item and the identification value of the at least one machine resource. In one example, the method involves scheduling a re-do of the at least one item subject to the discrepancy at the detected point in the designated workflow procedure. As an alternative or in addition, the method may involve preventing execution of subsequent processing of the at least one item in accordance with the designated workflow procedure, until the discrepancy is rectified.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured as a host or server.

FIG. 5 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As used herein, a workflow may be described as the culmination of resources (e.g., people, machines, data), processes and a sequence of processes or steps to be executed for operating upon or producing items in a desired fashion to obtain an intended finished hardcopy document product. A defined workflow generally represents the path by which various work tasks are to be performed in order to yield a desired outcome. It will be appreciated by those skilled in the art that the exemplary teachings herein pertain to a method and system for enabling progressive tracking and controlling of items in relation to any other items as they are morphed or transformed to produce a desired hardcopy document end-product or production outcome. Exemplary items capable of being processed or undergoing transformation as the result of an executed workflow procedure or process step thereof may include, but is not limited to: inserts, plastic cards, billing statements, labels, coupons, letters, envelopes, wrappers or virtually any article capable of placement into an envelope or package intended for transport or delivery to a destination location by a delivery or carrier service (e.g., United States Postal Service, Federal Express, private courier). Furthermore, it will be recognized by those skilled in the art that the teachings herein enable a convenient means of workflow integrity analysis to be performed based on real-time data pertaining to the transformation of said items during process.

The present concepts are applicable to a variety of production environments, that is to say, any production environment intended to produce a variety of different finished hardcopy document products. For purposes of discussion, the examples herein will focus on processing of items to form finished documents and/or mail articles containing the documents, that is to say, implementation of the tracking and workflow verification techniques in the context of a document and/or mail production environment. As such, finished hard copy document products produced via employment of the techniques presented herein may include, but are not limited to, one or more of a combination of: letter mail, flat mail, packages, periodicals, catalogs and other bounded print documents, etc.

Figure 1:
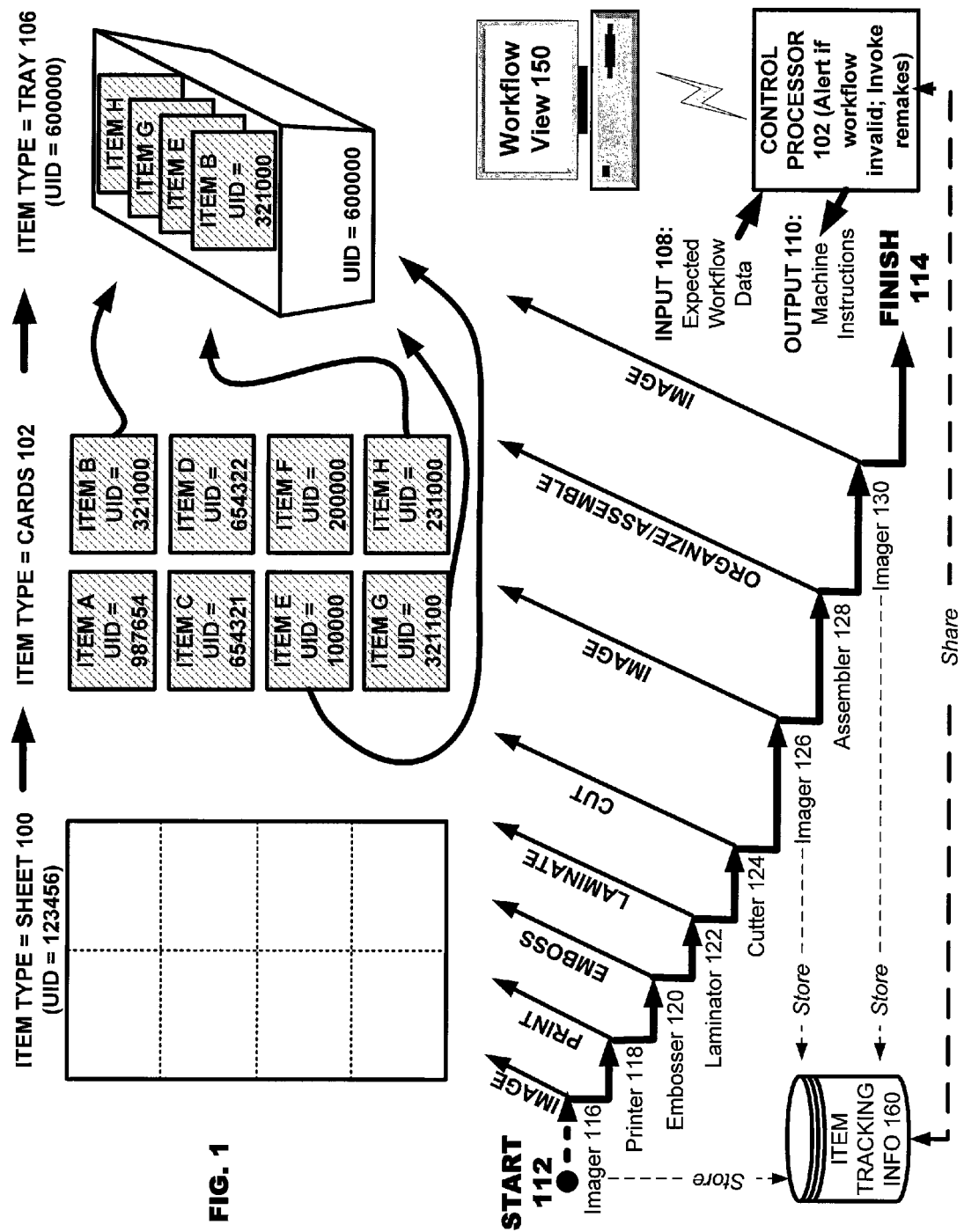
FIG. 1 is an exemplary depiction of a plurality of items being operated upon by one or more processing devices in accord with a defined workflow procedural template.

FIG. 1 is an exemplary depiction of a plurality of items being operated upon by one or more processing devices in accord with a defined workflow procedural template. The workflow procedural template is an instruction set (e.g., definition file, hardware abstraction layer (HAL) file) composed in a machine executable language or syntax that defines but is not limited to the following: the one or more items involved in the procedure (job) to be executed, the one or more machines involved in the procedure to be executed, one or more processes to be performed by the machines in sequential execution, the relationships between items and/or processes to be performed by the machines to complete the procedure to be executed and data to be accessed to complete the procedure to be executed. In addition, the workflow procedural template may define the various relationships between items involved in the procedure to be executed. For example, in a document processing environment, a plurality of distinct inserts, each having their own unique assigned item identification, may be associated with a single envelope into which the inserts are to be inserted as part of the workflow procedure. The relationship between these inserts and the envelope may be expressly defined in the workflow procedural template.

The workflow procedural template serves as input 108 to a control processor 102 operating in connection with the one or more machines required to properly execute the job. The control processor 102 may be implemented as a dedicated management server, a centralized production management operating system or a combination thereof. Based on the input provided, it may call for the execution of (output) various machine instructions 110 as required of the disparate devices, thus harmonizing their execution in order to complete the job in accord with design indicated by the workflow template 108. As an example, consider a particular type of item in the form of a teslin sheet 100 (referred to at times simply as sheet 100) that is to be ultimately converted into a plurality of drivers license cards 102, which are further to be organized into trays of finished drivers license cards 106. The workflow procedure to be performed from START 112 to FINISH 114 to complete this job involves various machines and processes to be invoked in a particular order. With various machines and processes required, this means the workflow procedure as prescribed in the workflow template for this job may itself comprise execution of multiple interdependent and/or concurrent or parallel workflows (by machine) for successful execution.

Exemplary workflow processing to achieve the desired production outcome (individual and customized drivers license cards 102) may include, but is not limited to: imaging the teslin sheet 100 once it is fed into a document processing device (e.g., inserter system) by a camera, scanner or reader (referred to herein as imager 116); printing onto the teslin sheet 100 the necessary data to produce distinct driver's licenses by a printer 118; embossing and laminating the teslin sheet by an embosser 120 and laminator device 122 respectively; cutting the teslin by a cutter 124 into distinct cards 102, recognized individually as items A-H; imaging each individual item A-H by another imager 126; assembling/organizing select card items, namely B, E, G and H into a tray 106 by an organizer/assembler device 128 in accord with an assembly scheme; and imaging the tray 106 by another imager 130. Of course, the workflow procedure performed (e.g., the sequence of processing events) may vary depending on the processing requirements, resource constraints, resource availability and other factors.

In the example of FIG. 1, each operation performed by the imagers 116, 126 and 130 results in the capture of data that may be relayed to an item tracking database 160. In particular, each individual item type (e.g., sheet 100, cards 102, tray 106) intended to render or related to a final item type (e.g., tray 106 containing one or more cards 102) or finished hard copy document product may be associated or assigned a unique identification value, which is defined in advance of processing within the workflow procedural template 108. The unique identification value may appear on each item and/or product during processing in the form of a general barcode, postal authority barcode, graphic, alphanumeric value, account number, radio frequency identifier, production control code, process step identification, machine code, etc. In other instances, the identification may be a physical or functional parameter, such as a fold, color code, target mark, etc. Such identifiers may be applied before or during the workflow procedure. In this way, items are able to be progressively tracked as they are produced, processed and/or transformed—either from merging or associating with other items or as they are segregated and/or aggregated into distinct, additional, related items—throughout the workflow procedure. As will be described in subsequent detail, additional data pertaining to the item may also be stored as the image data is acquired including timestamp data, an identification value assigned to the machine resource in question (machine identification), metadata and other pertinent information that characterizes the production process/job in progress. Consequently, each process or step within the workflow procedure may be related to another process or item via progressive tracking, reviewed in real-time via a graphical user interface (workflow view) 150, and utilized to subsequently affect execution of downstream processing decisions. It will be noted by skilled practitioners that some or all of the data conveyed by the imagers 116, 126 and 130 may alternatively be entered manually into the item tracking database 160 in some instances.

Figure 2:
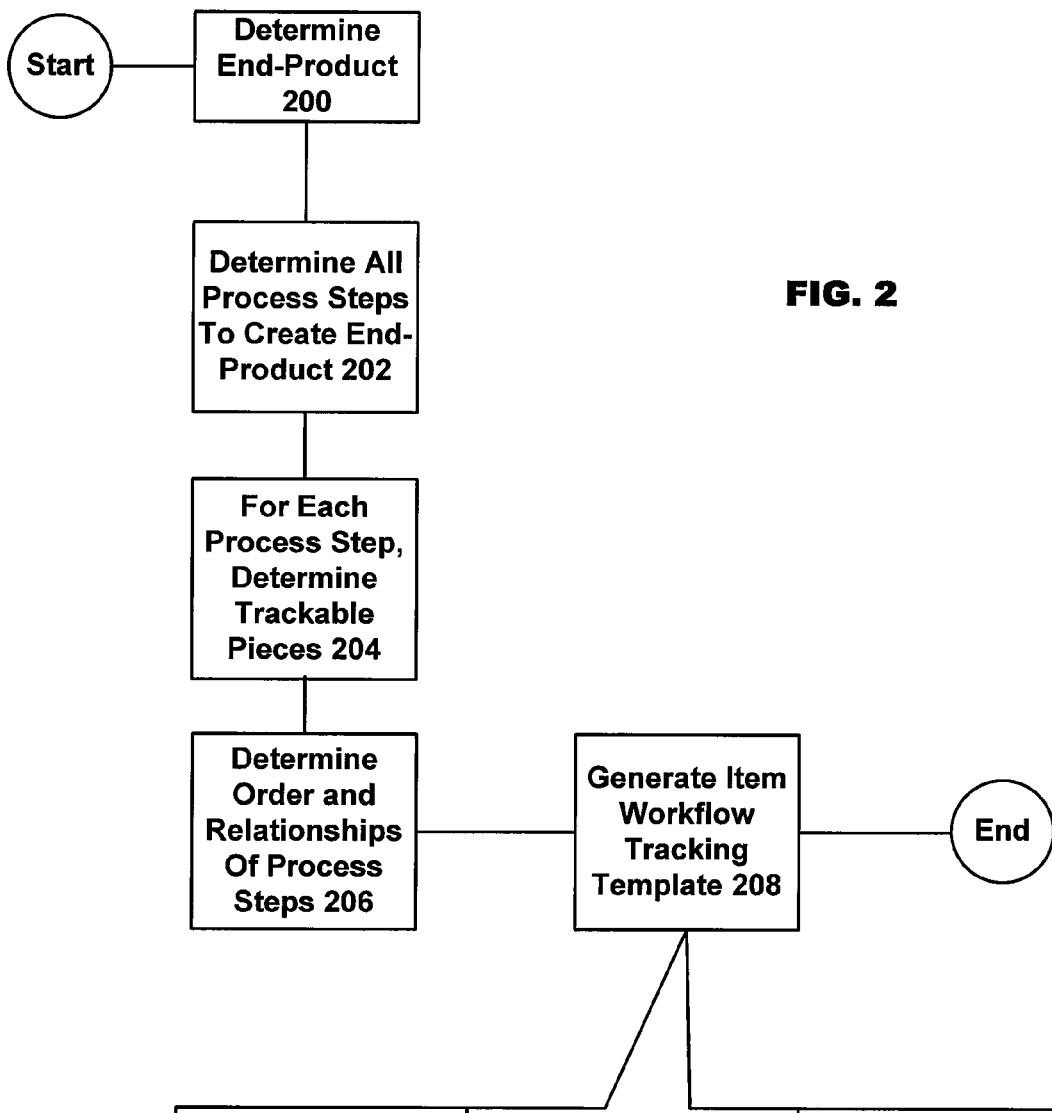
FIG. 2 depicts an exemplary process for generating a workflow procedural template.

FIG. 2 depicts an exemplary process for generating a workflow procedural template 108. As a first step (START), the end product, deliverable or item(s) to be manufactured, generated, assembled, processed or arranged must be defined (event 200). For example, in the case of an auto manufacturing facility, a desired outcome to be generated via the machine, data and/or human resources employed may be the production of a door, which may be comprised of various distinct parts (items) requiring assembly in a specific order to render a complete end-product. As another example, depicted in the figure, consider a document manufacturing/processing facility that desires to generate a plurality of mail articles (the end-product/deliverable) comprised of distinct items. In a specific example, a custom mailer (finished mail article) might include an envelope containing a birth certificate, a social security card with carrier and a letter of congratulations pertaining to the birth of a newborn. A primary list of the social security numbers (unique identifiers)—i.e., maintained within a database or table—to be assigned to and ultimately printed onto individual cards would be defined as part of determination step 200. As a further step, one or more unique identifiers may be assigned to the congratulation letters and birth certificates respective to the individual cards. In this way, each item is defined and assigned to the workflow procedure in accordance with a unique identifier value. Unique identifiers may also be assigned to enable identification of the finished products, that is to say mailers or mail articles in the example produced via execution of the workflow procedure.

Once the unique identifiers are established for each item, a determination is made as to the workflow procedural steps required to render the desired end-product (event 202). So, for example, the finished end product or article in the form of an envelope (one item) containing or related to other items such as a congratulatory letter, a birth certificate and a card with carrier, may require the workflow steps as listed in the following TABLE 1:

TABLE 1

Exemplary workflow procedure for preparation of a congratulatory mailer

| ITEM TYPE | PROCEDURAL SEQUENCE |
|---|---|
| Letter | Generate Print File→ Print letters, one for each social security number |
| Certificate | Generate Print File→ Print Certificates→ Emboss Certificates |
| Cards | Generate Print File→ Print Teslins→ Hot Stamp Teslins→ Emboss Teslins→ Cut Teslins into cards, Laminate Cards→ Assign card(s) to card carriers |
| Card Carriers | Open assigned card carrier→Insert assigned card to assigned card carrier (each card carrier has unique item identifier) |
| Envelope | Insert letter, certificate, card with carrier all associated with same SS# into the same envelope |

The '→' symbol as used in TABLE 1 indicates the procedural sequence of the steps as they are to be invoked to render each item included in the mailer. Although presented from a high-level perspective, various other sub-processes required to execute those steps presented in TABLE 1 may also need to be directly or indirectly defined (e.g., via a workflow template), including but not limited to: inserter control functions and sequences, folder operational control functions and sequences, etc. Hence, those skilled in the art will recognize that alteration in the sequence of steps to be performed results in alteration of workflow procedural execution and perhaps the end product.

Also, the item types involved in the above described workflow procedural sequence which are to be tracked must be defined (event 204). In keeping with the example of FIG. 2, this would include tracking of the envelopes, the print file record and actual printed sheet employed to manufacture the congratulatory letter, the print file record and actual printed sheet employed to manufacture the birth certificate, the teslin and cards generated to manufacture the social security cards, and the card carrier employed to hold the social security cards. As stated, each of the above described items to be tracked would be associated with or assigned a particular unique identifier. In this way, the relationships of the workflow procedural sequences and the items may be established (event 206). For example, the relationship between the procedural step of "Apply Card(s) to card carriers" relates to two different item types, namely the card and the card carrier. As another exemplary relationship, consider the relationship between the envelope and all of the items to be inserted therein, or the relationship between the teslin sheet and the individual cards generated from it.

Various other card processing tasks may be performed in addition to the exemplary workflow processing steps above. For example, cards 102 may be placed into boxes, another item type, as opposed to trays 106 for further additional processing upon them. In some cases, the boxes may be transported by a delivery carrier (e.g., a private carrier, courier service) to another processing device or facility. Once delivered or transported, the cards may undergo additional processing as a part of the workflow, including being loaded onto a specialized card processing device (e.g., a Plastic Card System) for enabling various functional, security or aesthetic customizations. This transformation may be characterized by the addition, affixing or embedding of items onto each card—i.e., ink, microchips, labels, adhesives, film coatings, magnetic strips, imprints, embossments, watermarks, seals, fiber coatings, etc, all of which enable a means of personalization of each card. Those skilled in the art will recognize that where feasible, such items may too be appropriately monitored and tracked in accord with the exemplary method and system herein.

Different processing devices may be employed to perform card customization in accordance with an established workflow procedure. Such devices may include but are not limited to: heat transfer printing systems, laser printers, embossers 120, laminators 122, electronic microchip setters, etc. In some instances, the various customization procedures presented may be applied to sheet 100 as opposed to individual cards 102. For example, micro chips may be mounted (inlayed) directly into the sheet 100 during the casting process, or in the case of laminated cards, the area in which the chip is to ultimately be placed may be milled out at the appropriate place on the sheet.

As a final step (event 208), the above definitions (from events 200-206) are compiled and aggregated into a workflow procedural template, which as described will comprise data of a given format conveying at least the following: the one or more items 210 involved in the procedure (job) to be executed, the one or more machines 212 involved in the procedure to be executed, one or more processes to be performed 214 by the machines in sequential detail and the relationships between processes and/or items 216. An exemplary depiction of the syntax of a finished workflow procedural template is shown below:

```
DEFINE WF-TEMPLATE = <template-name>
    START LIST-TYPE = <list-type>
        WF-STEPS = <wf-step1>, <system-id1>, <system-id2>, ...
        WF-STEPS = <wf-step2>, <system-id1>, <system-id2>, ...
        ...
    END LIST-TYPE
    START LIST-TYPE = <list-type>
        WF-STEPS = <wf-step1>, <system-id1>, <system-id2>, ...
        WF-STEPS = <wf-step2>, <system-id1>, <system-id2>, ...
        ...
    END LIST-TYPE
    START RELATIONSHIP
        TYPE=<Relationship_typ>
            RELATE <itemId> TO <Rel_itemId>
            RELATE <itemId> TO <Rel_itemId>
            RELATE <itemId> TO <Rel_itemId>
            ...
    END RELATIONSHIP
    START RELATIONSHIP
        TYPE=<Relationship_typ>
            RELATE <itemId> TO <Rel_itemId>
            RELATE <itemId> TO <Rel_itemId>
            RELATE <itemId> TO <Rel_itemId>
    END RELATIONSHIP
END WF-TEMPLATE
```

Syntax elements pertaining to the template presented above are shown in TABLE 2 below. Of course those skilled in the art will recognize that various programmatic languages, syntaxes, etc. may be employed for generating a workflow procedural template executable by the control processor.

TABLE 2

Exemplary Template Syntax

| Name | Description |
| --- | --- |
| template-name | Name of the template |
| list-type | Name of the list type |
| wf-step | Workflow step like 'print', 'sort', 'insert' |
| system-id | System id of the device that is associated with a wf-step |
| itemId | Id of item to be tracked in association with a wf-step |
| Rel_itemID | itemId of an item to be related to another item |
| Relationship_typ | Description of the nature of the relationship between items |

Figure 3:
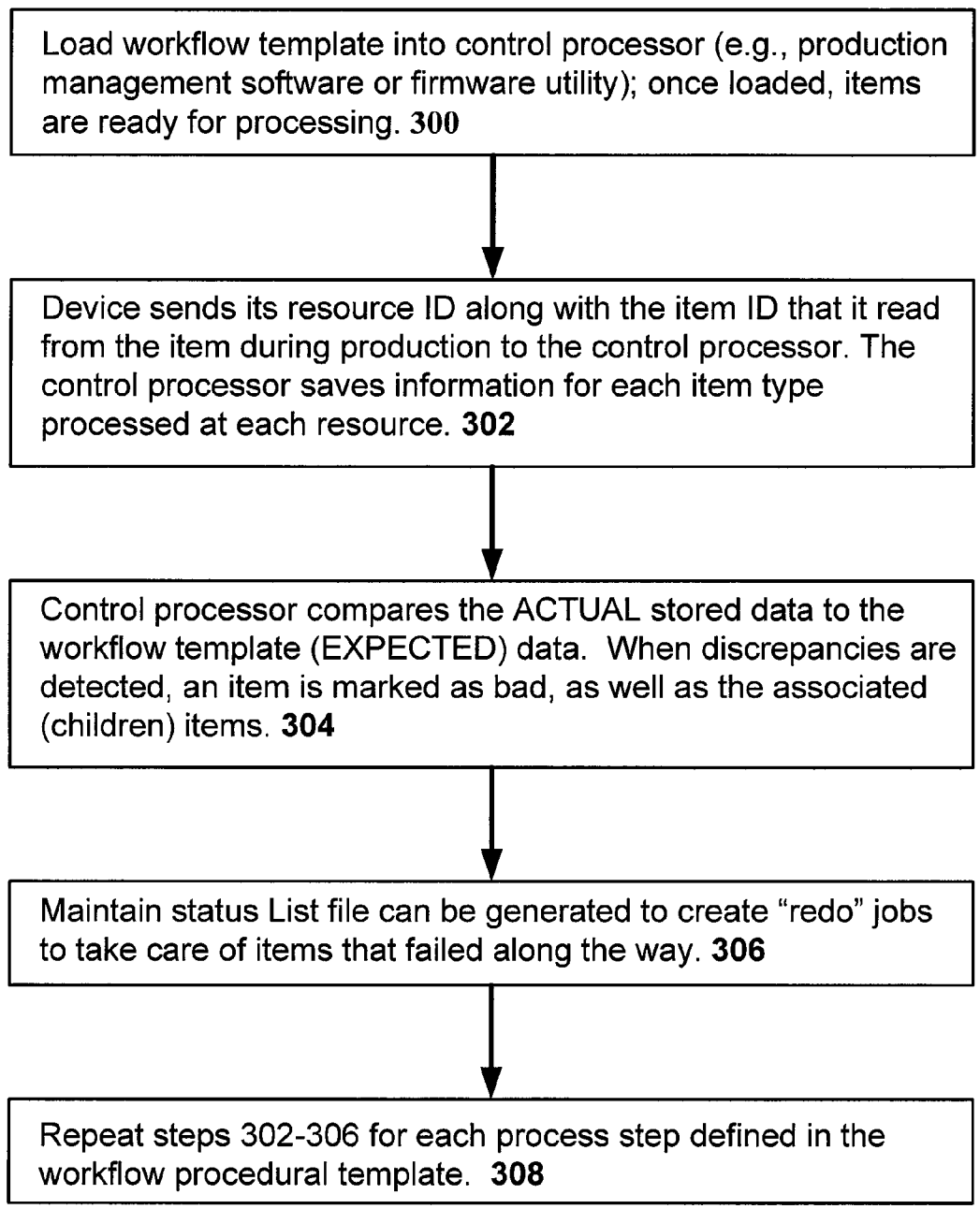
FIG. 3 is a high-level depiction of the overall process by which items may be progressively tracked in relation to other items to render a desired production outcome.

FIG. 3 is a high-level depiction of the overall process by which items may be progressively tracked in relation to other items to render a desired production outcome. As a first step, the above described workflow procedural template 108 is provided to (loaded into) the control processor (e.g., a firmware utility or a production management software utility such as BÖWE One®, developed by BÖWE Bell Howell Company). Once this file is loaded, the production process may proceed (event 300). As items are processed during the production run by a particular device as identified in the template 108, the device sends its resource identification to the control processor, therefore acknowledging it processed an item. Also, in conjunction with the machine identification, the item identification is read from the item and sent to the control processor (event 302). Data descriptive of the particular process/task performed by the device, such as a defined process code, error code, execution code or other metadata may also be sent along. The item identification data may be read by a vision system, a barcode scanner or even entered by an operator via keyboard entry in connection with a graphical user interface 150. Hence, data descriptive of the identification value assigned to the machine resource and data descriptive of the identification value of the item in process is provided to the control processor.

The control processor receives the item identification value for each item type processed at each resource (device). The control processor then performs analysis of the item relative to the workflow template as designed, which includes at least a comparison of the ACTUAL stored data, as captured in real-time during processing to the workflow template (EXPECTED) data pertaining to the item at that moment of execution. When discrepancies are determined to have occurred as a result of this analysis, an item may be flagged as a failure, as well as the associated (children) items (event 304). In many instances, there is now discrepancy from the workflow, and the control processor permits execution of the respective process upon determining that each of one or more of items to be processed by the respective process have been transformed through all processes preceding the respective process and in the order for the preceding processes as specified by the defined sequence. However, in some instances, of processing of individual physical items required to produce other instances of the finished hard copy document product during a continuation of the production run in accordance with the workflow procedure, the control processor detects a discrepancy. Various procedures may be triggered to deal with the discrepancy. So, for example, if a teslin sheet is tagged as a failure (meaning it violated an expected workflow procedure as defined), then any card items that emanated from the teslin would also be appropriately tagged in the database and processing of all of those tagged items would be modified accordingly.

Also, at various points along the workflow execution, a Status List file can be generated to create "re-do" jobs to take care of items that failed along the way. This enables the automated scheduling of a "re-do" of the teslin at that point in the workflow with appropriate "re-do" of associated types as needed. The re-do (necessary reproduction) of say a final driver's license will either require a re-do of the master teslin containing that license, or alternatively a rebuild of a new master teslin with all the re-done cards built in.

In an alternative implementation, a permission based mode of processing (PBP) may be engaged wherein each item as defined gets permission for the workflow procedure as defined to actually be performed. In other words, each item will get permission via the control processor before execution of the next prescribed procedural process with respect to that item. As such, execution of a particular process is permitted only upon determining that each of the one or more of items to be processed by the respective process has been transformed through all processes preceding that process step and in the order for the preceding processes as specified by the defined sequence of the workflow template. Conversely, if there is a problem with an item not having all the processing steps as defined by the workflow template completed in the order or sequence defined, subsequent processing upon the item is interrupted to enable the removal of the defective item. Hence, the next defined workflow procedural step to be executed is delayed until permission is granted, such as by an operator or based on a computer generated instruction (exception handling). Of course, such delay informs the operator that a workflow execution error has occurred, but still enables the production effort and/or device operations to continue on if desired.

As an example of the above described permission based mode of processing, consider a scenario wherein an operator improperly loads a plurality of mail items having assigned item identifier values 1-10000 onto machine resource A instead of loading items 30000-40000 on resource A as expected (dictated by workflow template). During processing of the items by machine resource A, item 1 would be detected and the identifier value would be analyzed against the process steps prescribed by the workflow template. In particular, the analysis performed would be a determination as to whether machine resource A is supposed to be processing detected item 1 in the prescribed manner at that detected point in process of the workflow procedure. For this example, the analysis would indicate that machine resource A should be operating upon item 1 at this point in process. As a result, the control processor generates an error message describing the error condition and/or what process was missed and/or the corrective action needed to be taken by the operator. Moreover, permission for subsequent processing upon item 1 in accord with the workflow template is delayed or prevented entirely until the cause of error is addressed—hence permitting only the desired operative workflow to occur. A corrective action may include scheduling or execution of a redo of the item or associated items therewith, diversion of the item, rejection of the item, etc. Such corrective measures may be operator prompted or machine executed in accord with predetermined instructions. Skilled artisans will recognize that this approach enables an operator to quickly identify and then adapt to workflow procedural errors, device errors or other operational defects.

The exact data stored for each item and resource may include, but is not limited to:

Time Completed
Item Status
Operator
Resource
Image of item
Failure mode details
Various metadata Finally, steps 302-306 are repeated for each process step in the item workflow (event 308). Resultantly, data is progressively maintained in the tracking database—such as by the control processor or master control computer—to enable data suitable for maintaining an audit or report status on each individual item type and/or collection of item types (not just the final delivered type).

As shown by the above discussion, functions relating to the tracking and controlling processing of the physical items required to produce a finished hard copy document product may be implemented on one or more computers operating as the control processor 102 connected for data communication with the processing resources and any additional readers along the processing line as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the workflow templates for a number of production jobs as well as the various files for tracking data accumulated during one or more productions runs. The software code is executable by the general-purpose computer that functions as the control processor 102 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for tracking and controlling processing of the physical items required to produce a finished hard copy document product, in essentially the manner performed in the implementations discussed and illustrated herein.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and, as a result, the drawings should be self-explanatory.

For example, control processor 102 may be a PC based implementation of a central control processing system like that of FIG. 5, or may be implemented on a platform configured as a central or host computer or server like that of FIG. 4. Such a system typically contains a central processing unit (CPU), memories and an interconnect bus. The CPU may contain a single microprocessor (e.g., a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking and controlling processing of the physical items required to produce a finished hard copy document product, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for progressively tracking and controlling processing of a plurality of individual physical items required to produce a finished hard copy document product for transport to a destination location, as a result of a production run, through a sequence of processes executed in a workflow procedure intended to produce the finished product, the method comprising steps of:
    (A) initializing a workflow template identifying each of the plurality of individual items, one or more machines use to produce the finished product, a plurality of processes to be executed by the one or more machines to transform individual items from one state to another, in an order of a sequence of the processes defined in accord with a workflow procedure, and relationships between individual items;
    (B) starting the production run, to produce the finished product, in accordance with the workflow procedure;
    (C) during the production run, recording at each respective process executed in the workflow procedure upon completion of item transformation by the respective process, at least:
        i) an identification value assigned to at least one of the plurality of individual items upon which the respective process has been executed; and
        ii) the identification value assigned to a machine resource which executed the respective process on the at least one individual item; and
    (D) before at least one respective process is executed in the workflow procedure:
        a) analyzing the recorded data for one or more of the items to be processed by the one respective process, and
        b) permitting execution of the one respective process only upon determining that each of one or more of items to be processed by the one respective process has been transformed through all processes preceding the one respective process and in the order for the preceding processes as specified by the defined sequence.

2. The method of claim 1, further comprising a step of outputting the finished hard copy document product for transport to the destination location only upon determining that all items required to produce the finished hard copy document product have been transformed through all processes and in the order as specified by the defined sequence.

3. The method of claim 1, wherein:
    at least two of the processes of the workflow procedure are concurrently executed in parallel on respective different ones of the items; and
    a later process of the workflow procedure combines processed items from the parallel processes.

4. The method of claim 1, wherein at least one of the processes divides an initial input item into a plurality of items for processing through one or more further processes of the workflow procedure as part of the production of a plurality of finished products.

5. The method of claim 1, further comprising a step of assigning an identification value to each of the plurality of individual items, the finished product and each of the one or more machines needed for the production run.

6. The method of claim 1, further comprising:
performing step (C) with respect to processing of individual physical items required to produce another instance of the finished hard copy document product during a continuation of the production run in accordance with the workflow procedure;
before at least one respective process is executed in the workflow procedure with respect to production of the other instance of the finished hard copy document product:
 a) analyzing the recorded data for one or more of the items to be processed by the one respective process, and
 b) detecting a discrepancy with respect to the processing of one or more of the physical items required to produce the other instance of the finished hard copy document product with respect to one or more of the preceding processes as specified by the defined sequence.

7. The method of claim 6, further comprising at least one of:
permitting execution of the respective process on one or more of the physical items required to produce the other instance of the finished hard copy document product, in response to computer generated instructions;
delaying execution of a subsequent process of the defined sequence of the workflow procedure;
diverting an item subject to the discrepancy and any associated items; and
initiating a re-do of at least one item subject to the discrepancy.

8. The method of claim 6, further comprising identifying an item subject to the discrepancy and other items to which the subject item is related as invalid with respect to the processing to produce the other instance of the finished hard copy document product during continuation of the production run.

9. The method of claim 6, further comprising steps of:
scheduling a re-do of an item subject to the discrepancy, at a specified process of the workflow procedure;
executing the re-do of the subject item in accordance with the schedule; and
executing one or more of the processes of the workflow procedure after the specified process, to produce the finished product using the re-do of the subject item.

10. The method of claim 6, further comprising steps of:
stopping the workflow procedure during execution of one of the processes on an item subject to the discrepancy; and
resuming the workflow procedure from execution of the stopped process only in response to receipt of a grant of permission to continue processing of the subject item from an operator.

11. The method of claim 1, wherein:
the finished product is a mail article intended for delivery to an addressed recipient's location; and
each item is a mail-related item.

12. A document production system, comprising:
one or more machines use to produce the finished hard copy document product for transport to a destination location from a plurality of individual physical items by executing a plurality of processes, each process transforming one or more of the individual items from one state to another;
a computer coupled to communicate with the one or more machine resources, for progressively tracking and controlling processing of individual physical items through the execution of the transformations by the plurality of processes, the computer being programmed to perform functions including:
(A) initializing a workflow template identifying each of the plurality of individual items, the one or more machines needed for the production of the finished product, a plurality of processes to be executed by the one or more machines to transform individual items from one state to another, in an order of a sequence of the processes defined in accord with a workflow procedure, and relationships between individual items;
(B) starting the production run, to produce the finished product, in accordance with the workflow procedure;
(C) during the production run, recording at each respective process executed in the workflow procedure upon completion of item transformation by the respective process, at least:
 i) an identification value assigned to at least one of the plurality of individual items upon which the respective process has been executed; and
 ii) the identification value assigned to one of the machines which executed the respective process on the at least one individual item; and
(D) before at least one respective process is executed in the workflow procedure:
 a) analyzing the recorded data for one or more of the items to be processed by the one respective process, and
 b) permitting execution of the one respective process only upon determining that each of one or more of items to be processed by the one respective process has been transformed through all processes preceding the one respective process and in the order for the preceding processes as specified by the defined sequence.

13. The system of claim 12, further comprising one or more readers, imagers or verifiers for capturing the identification values as printed on the items during transport thereof through or between the one or more machine resources.

14. The system of claim 12, wherein one or more of the machine resources are configured for capturing the identification values as printed on the items during processing thereof.

15. A method for progressively tracking and controlling processing of a plurality of individual physical items required to produce a finished hard copy document product for transport to a destination location, as a result of a production run, through a sequence of processes executed in a workflow procedure intended to produce the finished product, the method comprising steps of
A) processing one or more items by one or more machines through a workflow procedure designated in accordance with a workflow procedural template, each of the respective one or more items and the one or more machines assigned a unique identification value;
B) obtaining the identification value of the one or more items as the one or more items are processed by each of the one or more machines;
C) sending, to a control processor, the obtained identification value of the one or more items in connection with the identification of the one or more machine resources upon which the one or more items were processed;

D) detecting, by the control processor, a discrepancy in processing in accordance with the workflow template, at a point in the designated workflow procedure;

E) in response to the discrepancy, based at least in part on the recorded identification value of at least one item and the identification value of one of the machines, performing one of the following:
   a) scheduling a re-do of the at least one item subject to the discrepancy at the detected point in the designated workflow procedure; and
   b) preventing execution of subsequent processing of the at least one item in accordance with the designated workflow procedure until the discrepancy is rectified.

16. The method of claim 15, wherein the obtaining step is performed by a reader, imager, verifier during transport of an item thereof or between the one or more the one or more machines.

17. The method of claim 15, wherein the obtaining step is performed by a respective one of the machines during or as a result of processing of an item.

18. A method for progressively tracking and controlling processing of a plurality of individual physical items required to produce a finished hard copy document product for transport to a destination location, as a result of a production run, through a sequence of processes executed in a workflow procedure intended to produce the finished product, the method comprising steps of:
   (A) initializing a workflow template identifying each of the plurality of individual items, one or more machines use to produce the finished product, a plurality of processes to be executed by the one or more machines to transform individual items from one state to another, in an order of a sequence of the processes defined in accord with a workflow procedure, and relationships between individual items;
   (B) starting the production run, to produce the finished product, in accordance with the workflow procedure;
   (C) during the production run, recording at each respective process executed in the workflow procedure upon completion of item transformation by the respective process, at least:
      i) an identification value assigned to at least one of the plurality of individual items upon which the respective process has been executed; and
      ii) the identification value assigned to one of the machines which executed the respective process on the at least one individual item;
   (D) before at least one respective process is executed in the workflow procedure:
      a) analyzing the recorded data for one or more of the items to be processed by the one respective process, and
      b) detecting a discrepancy with respect to the processing of one or more of the physical items required to produce the finished hard copy document product;
   (E) scheduling a re-do of an item subject to the discrepancy, at a specified process of the workflow procedure;
   (F) executing the re-do of the subject item in accordance with the schedule; and
   (G) executing one or more of the processes of the workflow procedure to produce the finished product, using the re-do of the subject item.

19. The method of claim 18, wherein:
the finished product is a mail article intended for delivery to an addressed recipient's location; and
each item is a mail-related item.

20. A document production system, comprising:
one or more machines use to produce the finished hard copy document product for transport to a destination location from a plurality of individual physical items by executing a plurality of processes, each process transforming one or more of the individual items from one state to another;
a computer coupled to communicate with the one or more machine resources, for progressively tracking and controlling processing of individual physical items through the execution of the transformations by the plurality of processes, the computer being programmed to perform functions including:
   (A) initializing a workflow template identifying each of the plurality of individual items, the one or more machines needed for the production of the finished product, a plurality of processes to be executed by the one or more machines to transform individual items from one state to another, in an order of a sequence of the processes defined in accord with a workflow procedure, and relationships between individual items;
   (B) starting the production run, to produce the finished product, in accordance with the workflow procedure;
   (C) during the production run, recording at each respective process executed in the workflow procedure upon completion of item transformation by the respective process, at least:
      i) an identification value assigned to at least one of the plurality of individual items upon which the respective process has been executed; and
      ii) the identification value assigned to one of the machines which executed the respective process on the at least one individual item;
   (D) before at least one respective process is executed in the workflow procedure:
      a) analyzing the recorded data for one or more of the items to be processed by the one respective process, and
      b) detecting a discrepancy with respect to the processing of one or more of the physical items required to produce the finished hard copy document product;
   (E) scheduling a re-do of an item subject to the discrepancy, at a specified process of the workflow procedure;
   (F) executing the re-do of the subject item in accordance with the schedule; and
   (G) executing one or more of the processes of the workflow procedure to produce the finished product, using the re-do of the subject item.

21. The system of claim 20, further comprising one or more readers, imagers or verifiers for capturing the identification values as printed on the items during transport thereof through or between the one or more machine resources.

22. The system of claim 20, wherein one or more of the machine resources are configured for capturing the identification values as printed on the items during processing thereof.

23. A non-transitory computer readable medium embodying a program, wherein execution of the program causes a computer to implement the method of claim 1.

24. A non-transitory computer readable medium embodying a program, wherein execution of the program causes a computer to implement the method of claim 18.

* * * * *